United States Patent
Koeda

(10) Patent No.: US 7,455,957 B2
(45) Date of Patent: Nov. 25, 2008

(54) BLAZED HOLOGRAPHIC GRATING, METHOD FOR PRODUCING THE SAME AND REPLICA GRATING

(75) Inventor: Masaru Koeda, Muko (JP)

(73) Assignee: Shimadzu Corporation, Kyoto-shi (JP)

( * ) Notice: Subject to any disclaimer, the term of this patent is extended or adjusted under 35 U.S.C. 154(b) by 754 days.

(21) Appl. No.: 10/993,029

(22) Filed: Nov. 19, 2004

(65) Prior Publication Data

US 2005/0130072 A1    Jun. 16, 2005

(30) Foreign Application Priority Data

Nov. 27, 2003    (JP) .............................. 2003-397762

(51) Int. Cl.
  G03C 5/00    (2006.01)
  B29D 11/00    (2006.01)
(52) U.S. Cl. ......................................... 430/321; 216/24
(58) Field of Classification Search ........................ None
  See application file for complete search history.

(56) References Cited

U.S. PATENT DOCUMENTS 4,131,506 A * 12/1978 Namba et al. .......... 204/192.34

2001/0017184 A1 * 8/2001 Koeda et al. ................. 156/233
2002/0122255 A1 * 9/2002 Ogusu et al. ................. 359/566

FOREIGN PATENT DOCUMENTS

| JP | 55-40846 |   | 10/1980 |
| JP | 57112705 | A * | 7/1982 |
| JP | 61027505 | A * | 2/1986 |
| JP | 62231901 | A * | 10/1987 |
| JP | 04324401 | A * | 11/1992 |
| JP | 05151626 | A * | 6/1993 |

* cited by examiner

*Primary Examiner*—Martin J Angebranndt
(74) *Attorney, Agent, or Firm*—Rankin, Hill & Clark LLP

(57) ABSTRACT

A substrate is subjected to holographic exposure to a sinusoidal or half-sinusoidal resist pattern corresponding to grating groove thereon. Thereafter, the substrate and the resist pattern are subjected to a first etching step at which they are irradiated with an ion beam obliquely at an angle that is identical to the blaze angle in the presence of $CF_4$ as an etching gas, whereby they are cut until the height of the resist is about ⅓ of the initial value. Thereafter, the substrate is subjected to a second etching step at which the substrate is irradiated with an ion beam in the direction corresponding to the bisector of the vertex in the presence of a mixture of $CF_4$ and $O_2$ as an etching gas, whereby the substrate is cut until the resist disappears completely to an extent such that some overetching occurs.

5 Claims, 6 Drawing Sheets

BLAZED HOLOGRAPHIC GRATING, METHOD FOR PRODUCING THE SAME AND REPLICA GRATING

BACKGROUND OF THE INVENTION

1. Field of the Invention

The present invention relates to a grating (diffraction grating) which is a wavelength separating/selecting element for use in spectroscope, optical spectrum analyzer, WDM monitor, wavelength separator, etc. and a method for producing the grating. More particularly, the present invention relates to a blazed holographic grating prepared by a holographic exposure method and a method for producing the blazed holographic grating.

2. Description of the Related Art

A grating (diffraction grating) is a wavelength separating/selecting element for use in spectroscope, wavelength separator, etc. Various gratings are known by the profile of section of groove. These gratings include one called "blazed holographic grating (BHG)".

As a basic method for producing the blazed holographic grating there has been heretofore known one disclosed in Japanese Patent No. 1,046,763. In accordance with the production method disclosed in the above cited patent reference, a photoresist which has been spread over a substrate such as quartz and glass is exposed to interference band developed by two-beam interference, and then developed to form a resist pattern having a sinusoidal or half-sinusoidal section thereon (holographic exposure process). Thereafter, the substrate is irradiated with an ion beam obliquely with this resist pattern as a mask to form a desired braze angle of the substrate until the photoresist disappears so that it is etched to form a diffraction grating groove having a sawtooth section thereon. By coating the surface of the grating groove with a reflective material such as aluminum and gold to raise its reflectance, a blazed holographic grating allowing the concentration of energy of diffracted ray on a specific wavelength is obtained.

The grating thus prepared is greatly advantageous in that it has a high diffraction efficiency and generates little stray light but is also disadvantageous in that it takes much time to produce, adding to cost and the difference of performance among products can be difficultly eliminated. In an attempt to reduce the cost by mass production and eliminate the dispersion of performance, it has been practiced to produce a replica grating as a molded resin product from the original grating produced according to the aforementioned procedure as a matrix. In some detail, duplication of the original grating onto a desired substrate such as glass with a synthetic resin is conducted to prepare a negative mold from which a replica grating is then prepared. The replica grating thus prepared is somewhat inferior to the original grating in performance but is advantageous in that even when mass-produced, it has a high uniformity in performance, and it can be provided at drastically reduced cost. Of course, the performance of the original grating must be good to provide the replica grating thus prepared with a sufficient performance.

The basic procedure of engraving a grating groove directly on a substrate such as glass to prepare a blazed holographic grating has been described above. In practice, however, the performance of grating is impaired by various causes.

For example, the resist pattern (sinusoidal or half-sinusoidal diffraction grating groove) prepared by holographic exposure process has a surface roughness developed by the granularity of fine particles of photoresist and the noise generated during exposure. Since this resist pattern is obliquely etched to make sawtooth cutting while similarly cutting the substrate, the surface roughness of the photoresist appears on the reflective surface of the grating groove on the substrate. Further, end point control can be considerably difficultly made to terminate the etching just when the resist pattern formed on the substrate disappears during ion beam etching. Thus, in most cases, overetching tends to occur. Thus, the vertex of the grating groove is rounded, deteriorating the linearity of the two surfaces forming the vertex (i.e., giving a curved vertex). On the other hand, when the etching time is reduced to avoid such overetching, underetching can occur, leaving the desired vertex of the grating groove uncompleted.

FIG. 6 illustrates an AFM (atomic force microscope) image of the grating groove of a blazed holographic grating prepared by the aforementioned related art production method. As can be seen in FIG. 6, the reflective surface of the grating groove is roughened and the vertex of the grating groove is rounded and has an uneven surface. Further, the grating groove shows a crosswise meandering (periodical crosswise disturbance of groove). Such an improper profile of the grating groove makes it difficult to obtain a sufficient diffraction efficiency. Further, when this grating is used as a spectroscope, much stray light is generated because much scattered light is generated.

SUMMARY OF THE INVENTION

The invention has been worked out to solve the foregoing problems. An object of the invention is to provide a blazed holographic grating which comprises a sawtooth grating groove the vertex of which has an assured sharpness to attain a high diffraction efficiency and provide the two surfaces forming the vertex with an enhanced linearity and the reflective surface of which has a reduced roughness to eliminate scattered light, a method for producing the blazed holographic grating and a replica grating prepared from the blazed holographic grating.

In order to etch a substrate with a photoresist as a mask, it is normally practiced to cut the substrate faster than the photoresist. In particular, in order to cut a substrate into sawtooth (i.e., cut the substrate shortly under the photoresist into wedge), it is necessary that an etching gas giving a higher rate of etching on the substrate than that on the resist pattern be used. In the aforementioned related art method, ion beam etching which is made obliquely at the same angle as the blaze angle in the presence of such an etching gas is continued until the photoresist formed on the substrate is completely cut. Accordingly, the vertical surface roughness of the photoresist increases by the amount corresponding to the rate at which the substrate is cut faster than the photoresist and appears on the reflective surface of the grating groove. This also causes the worsening of crosswise meandering of the grating groove.

The fact that the photoresist has a roughened surface means that the height of the photoresist layer is not uniform. When the initial height of the resist pattern is not uniform, it is absolutely impossible to terminate the etching just when the entire resist pattern disappears. This is because if the etching is terminated when the photoresist disappears at the position where the initial resist pattern is thin (low), the photoresist still remains at the position where the initial resist pattern is thick (high), leaving the desired sawtooth grating groove uncompleted. On the contrary, if the etching is terminated when the photoresist disappears at the position where the initial resist pattern is thick, the etching has continued free of resist pattern at the position where the initial resist pattern is low and a sawtooth grating groove has already been completed. Therefore, the vertex of the groove which has been sharpened with much effort is rounded or becomes uneven due to etching.

In the case of ion beam etching in the presence of only $CF_4$, which is an ordinary fluorine-based gas, carbon in the photoresist, which is an organic compound and thus contains carbon, and fluorine in $CF_4$ gas are reacted with and bonded to each other. On the other hand, carbon in $CF_4$ ion separates out on the photoresist layer, giving a so-called carbon-riched state that not only prevents effective etching but also causes surface roughening, in the worst case, collapse of the profile of the resist pattern if the etching continues while carbon is left unremoved from the surface of the photoresist.

The present inventors made various experiments on the various factors causing the disturbance of the profile of grating groove focusing particularly on the angle of incidence of ion beam on the substrate having a resist pattern formed thereon during ion beam etching and the selectivity ratio of the etching gas determining the rate of etching. As a result, a process was found which comprises using in combination two etching steps having different angles of incidence of ion beam and selectivity ratios of etching gas to optimize the profile of the portion in the vicinity of the vertex of grating groove while suppressing the roughening of the reflective surface of grating groove.

In other words, the blazed holographic grating according to the invention which has been worked out to solve the aforementioned problems is prepared by a method which comprises subjecting a photoresist layer provided on a substrate to holographic exposure to form a sinusoidal or half-sinusoidal resist pattern thereon, irradiating the substrate with an ion beam obliquely at an angle that is almost identical to a desired blaze angle in the presence of a first etching gas having a high selectivity ratio (=rate of etching on photoresist/rate of etching on substrate) to execute a first ion beam etching until the height of the resist pattern is decreases to a predetermined ratio of the initial value, and then irradiating the substrate with an ion beam in the direction corresponding to almost half the vertical angle of the vertex of the grating groove pattern in the presence of a second etching gas having a smaller selectivity ratio than that of the first etching gas to execute a second ion beam etching until the remaining resist pattern disappears completely whereby a sawtooth grating groove pattern is engraved directly on the substrate.

The method for producing a blazed holographic grating according to the invention which has been worked out to solve the aforementioned problems comprises executing in sequence the following steps:

a) a resist pattern preparing step of subjecting a photoresist layer provided on a substrate to holographic exposure to form a sinusoidal or half-sinusoidal resist pattern thereon;

b) a first ion beam etching step of irradiating the substrate having a sinusoidal or half-sinusoidal resist pattern formed thereon with an ion beam obliquely at an angle that is almost identical to a desired blaze angle in the presence of a first etching gas having a high selectivity ratio to execute etching until the height of the resist pattern decreases to a predetermined ratio of the initial value; and c) a second ion beam etching step of irradiating the substrate with an ion beam in the direction corresponding to almost half the vertical angle of the vertex of the grating groove pattern in the presence of a second etching gas having a smaller selectivity ratio than that of the first etching gas to execute etching until the remaining resist pattern disappears completely, whereby a sawtooth grating groove pattern is engraved directly on the substrate.

In the blazed holographic grating and production method thereof according to the invention, the aforementioned "predetermined ratio" is determined depending on the selectivity ratio of the first and second etching gas used at the first and second ion beam etching steps, etc. In an embodiment of the blazed holographic grating and production method thereof, the first ion beam etching is terminated when the height of the resist pattern decreases to about ⅓ of the initial value, and then process then proceeds to the second ion beam etching step.

Further, as the first etching gas to be used at the first ion beam etching step there is used a fluorine-based gas and as the second etching gas to be used at the second ion beam etching step there is used a mixture of the fluorine-based gas with oxygen. In this arrangement, proper selection of the mixing ratio of oxygen in the fluorine-based gas makes it possible to control the selectivity ratio.

In other words, at the first ion beam etching step, the substrate is irradiated with an ion beam obliquely at an angle that is almost identical to a desired blaze angle in the presence of a first etching gas having a selectivity ratio such that the rate of etching on the substrate is greater than that on the photoresist to cut the sinusoidal or half-sinusoidal resist pattern generally tilted to the direction of ion beam radiation into a sawtooth shape on the exposed area of the substrate. At this point, since the selectivity ratio of the first etching gas is great, the surface roughness of photoresist rises and appears on the etched surface of the substrate depending on the selectivity ratio. However, the first ion beam etching is terminated while the resist pattern still remains, the surface roughness which has increasingly appeared on the etched surface of the substrate is not so great as described above.

Subsequently, at the second ion beam etching step, the substrate is irradiated with an ion beam in the direction corresponding to almost half the vertical angle of the vertex of the grating groove pattern in the presence of a second etching gas having a selectivity ratio such that the rate of etching on the photoresist is preferably greater than that on the substrate to undergo etching until the resist pattern disappears completely to engrave the substrate itself with grating grooves. In this case, as opposed to the first ion beam etching step, the surface roughness appearing on the etched surface of the substrate decreases by the amount of the selectivity ratio, making it possible to reduce the surface roughness from the original resist pattern. Even when the unevenness in the thickness of the resist pattern causes the timing of disappearance of resist pattern to be dispersed from position to position on the substrate, the etching rate decreases after the disappearance of resist pattern resulting in the exposure of the substrate, making it possible to prevent the vertex of the grating grooves from being rounded and roughened.

Further, when as the second etching gas to be used at the second ion beam etching step there is used a mixture of a fluorine-based gas with oxygen, the oxygen is bonded to carbon separated out on the surface of the photoresist and then carries it away, making it possible to prevent the surface of the resist pattern from being carbon-riched. As a result, the factor of inhibiting etching can be eliminated, making it possible to execute etching efficiently. Further, since etching is effected uniformly, little surface roughening can occur.

In accordance with the blazed holographic grating according to the invention and the production method thereof, the roughness of the reflective surface of the grating groove can be reduced more than ever. Further, the vertex of the grating groove can be sharpened. Moreover, the both surfaces forming the vertex have a good linearity. In this arrangement, a high diffraction efficiency can be attained and the scattered light can be drastically reduced. Accordingly, a spectroscope having this grating mounted thereon can radiate little stray light and thus exhibits drastically enhanced properties.

In accordance with the production method of a blazed holographic grating according to the invention, the necessity of effecting so-called related art just etching involving the termination of etching when the photoresist disappears can be eliminated. Even when some overetching is effected, little disturbance of groove arrangement and rounding of the vertex of the groove can occur. Accordingly, the yield in production can be enhanced, making it possible to reduce both the lead time and cost.

In accordance with the blazed holographic grating according to the invention and the production method thereof, a grating having reduced surface roughness of the grating groove and a good shape of the portion close to the vertex of the grating groove can be obtained as mentioned above. By transferring the grating groove pattern from the grating thus obtained as an original grating, a replica grating having a high performance can be easily obtained.

DETAILED DESCRIPTION OF THE INVENTION

An embodiment of the method for the production of a blazed holographic grating (hereinafter referred to as "BHG") according to the invention will be described in connection with FIG. 1. FIGS. 1 and 2 each are a schematic sectional view of various steps in the present embodiment of the method for the production of BHG. FIG. 3 is a schematic optical path diagram of a holographic exposure device for use in the production method of the invention.

(1) Step Of Forming Photoresist Layer

Figure 1A:
FIGS. 1A-1G are schematic sectional views of various steps (steps of producing original grating) according to an embodiment of the method for the production of a blazed holographic grating of the invention.

In FIG. 1A, a substrate 10 made of optical glass is a blank for preparing an original grating. By way of example, BK7 glass is used herein. The kind of the substrate 10 is not limited so far as it can be optically polished so that it can be coated with a photoresist. In general, optical glass has a low thermal expansion coefficient and thus can be preferably used as a grating substrate material. Besides BK7, low thermal expansion crystalline glass such as BSC2, Pyrex (trade name of product of Corning Incorporated) glass, soda glass, quartz glass, ZERODUR (produced by SCHOTT INC.; trade name of product of Carl Zeiss Inc.) and Crystron (trade name of product of HOYA CORPORATION) are useful.

Firstly, BK7 glass is optically polished to prepare a concave (optionally flat) glass substrate 10 which is then subjected to ultrasonic cleaning on the surface thereof. Thereafter, MP1400 (produced by Shifray Inc.) is spin-coated onto the glass substrate 10 as a photoresist at 2,500 rpm for 60 seconds, and then calcined at 90° C. in a convection oven for 30 minutes. In this manner, a photoresist layer 20 is formed on the surface of the substrate 10 to a thickness of about 300 nm (FIG. 1A). The photoresist to be used herein is not limited to the material described above but may be OFPR5000 (produced by Tokyo Ohka Kogyo Co., Ltd.).

(2) Step of Preparing Resist Pattern

Figure 1B:
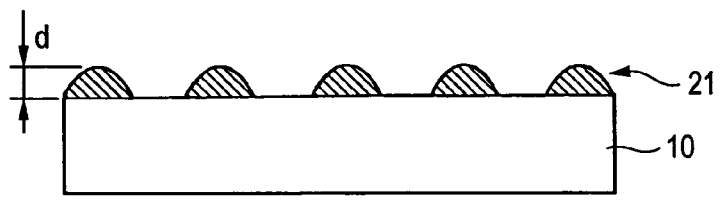

The work W having a photoresist layer 20 formed on the surface of the substrate 10 is put in a holographic exposure device having a configuration as shown in FIG. 3 where the photoresist layer 20 is then exposed to a latent image of interference band having a density of 900 lines/mm developed by two-beam interference. Simply explaining the configuration of the holographic exposure device in connection with FIG. 3, laser beam emitted by a laser beam source 30 such as He-Cd laser ($\lambda$=441.6 nm) is reflected by a reflector 31, and then splitted into two beams by a beam splitter 32. The two beams are reflected by flat mirrors 33a, 33b, passed through spatial filters 34a, 34b, reflected by off-axis parabolic mirrors 35a, 35b, reflected by flat mirrors 36a, 36b, respectively, and then incident on the photoresist layer 20 on the work W in two different directions, respectively. The two laser beams interfere with each other to form an interference band. The photoresist layer 20 on the work W thus exposed is developed with a dedicated developer, and then rinsed with purified water to form a resist pattern 21 comprising a diffraction grating pattern. At this time, the distribution of intensity in the interference band developed by two-beam interference is sinusoidal. Accordingly, the resist pattern 21 thus formed, too, has a sinusoidal or half-sinusoidal section (FIG. 1B). The depth (amplitude of sinusoidal wave) of the groove of the resist pattern 21 thus prepared can be determined by controlling the aforementioned exposure time and development time. The depth of groove d is predetermined to 200 nm herein.

(3) First Ion Beam Etching Step

The resist pattern 21 and the substrate 10 are subjected to reactive ion beam etching in an oblique direction that is perpendicular to the direction of arrangement of grating grooves in the resist pattern 21 (i.e., in-plane on FIG. 1) and at the blaze angle $\theta 0$ of grating (angle of inclination of grating groove) The blaze angle is predetermined to 10° herein. The substrate 10 is irradiated with an ion beam obliquely at an angle of 10° from the line normal to the substrate 10 (direction of $\theta 1$ of 80° from the direction perpendicular to the substrate 10). As an etching gas there is used $CF_4$, which has relatively high selectivity ratio (=rate of etching on substrate/rate of etching on photoresist layer).

Figure 1C:
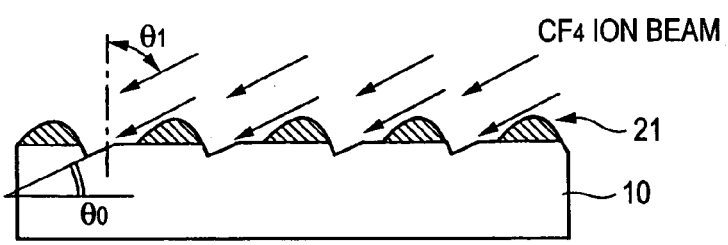
Figure 1D:
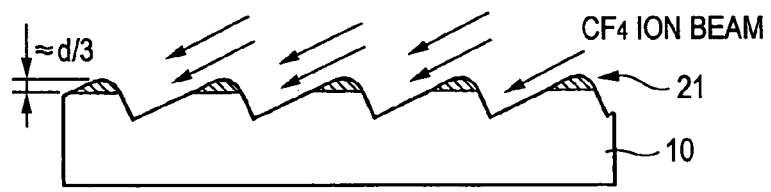

During this procedure, the resist pattern 21 is gradually cut as shown in FIG. 1C. Thus, the shape of the vertex of raised portions of half-sinusoidal photoresist pattern is changed inclined to the direction of incident ion beam. At the same time, the substrate 10 gradually begins to be exposed to ion beam at the area which has been shaded by the raised portion of photoresist. Thus, the substrate 10 is gradually cut into sawtooth pattern having a blaze angle of 10°. At this time, the substrate 10 is etched faster than the resist pattern 21 and thus is cut faster than the resist pattern 21. This ion beam etching continues until the height of the resist pattern 21 decreases about ⅓ of the initial height d. The first ion beam etching step is then terminated when the profile shown in FIG. 1D is reached, that is, when the raised portion of the resist pattern 21 is inclined to the direction of incident ion beam to form on the substrate 10 a groove having a surface inclined at an angle that is almost identical to the blaze angle.

(4) Second Ion Beam Etching Step

Figure 1E:
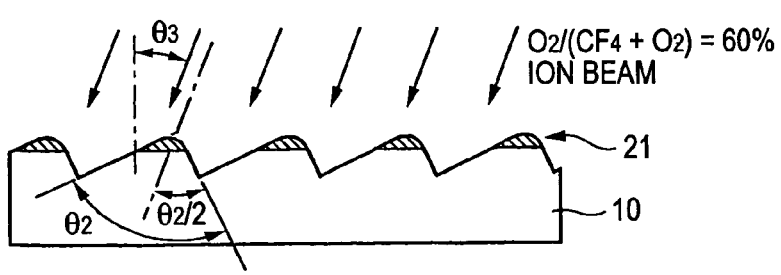

Subsequently, the resist pattern 21 and the substrate 10 are subjected to reactive ion beam etching in the direction that is perpendicular to the direction of arrangement of grating grooves in the resist pattern 21 and almost half the vertical angle θ2 of diffraction grating (FIG. 1E). In the present embodiment, since the blaze angle is 10° and the vertical angle θ2 is about 110°, the substrate 10 is irradiated with an ion beam in the direction of 65° from the line normal to the substrate 10 (θ3=25° from the vertical direction). As an etching gas there is used a mixture of $CF_4$ and $O_2$ having a mixing ratio $O_2/(CF_4+O_2)$ of 0.6 such that the selectivity ratio thereof is smaller than that at the first ion beam etching step. The gas pressure is $1.5\times10^{-4}$ Torr. The selectivity ratio can be controlled by changing the mixing ratio of $CF_4+O_2$.

Figure 1F:

During this procedure, the resist pattern 21 is further cut as shown in FIG. 1E. Thus, the resist pattern 21 is sharpened inclined to the direction of incident ion beam. The substrate 10 is similarly cut. This etching continues for about 10 minutes until the resist pattern 21 disappears. An overetching is then effected for about 5 minutes. In the case where the initial height d of the resist pattern 21 is dispersed, the photoresist at the point having a great height d can remain on the substrate 10 even after 5 minutes of etching but can be completely removed by this 5-minute overetching. When the second ion beam etching step is thus terminated, the substrate 10 has a diffraction grating pattern directly engraved thereon as shown in FIG. 1F. At this time, the blaze angle of the diffraction grating groove engraved on the substrate 10 is 10°. The two sides forming the vertical angle of about 110° are linear (not curved or bent). Further, the roughness of the surface in the vicinity of the vertex is very small.

(5) Step of Forming Reflective Layer

Figure 1G:
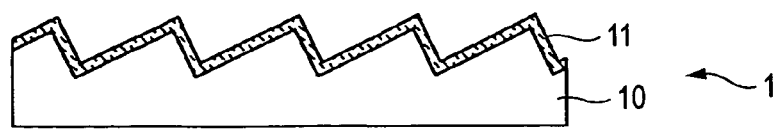

After the termination of the aforementioned etching step, the substrate 10 having grating grooves engraved thereon is cleaned and subjected to vacuum metallizing to form an aluminum (Al) layer 11 on the surface of the grating (FIG. 1G). While aluminum, which can provide a high reflectivity when the grating is used in a wavelength range of from ultraviolet to visible light, is used herein, a proper material may be used depending on the wavelength range used. In some detail, gold (Au), platinum (Pt) or X-ray multi-layer membrane may be used. The reflective layer may be used uncoated depending on the wavelength range used. When the aforementioned various steps are finished, an original grating 1 is completed.

The procedure of preparing a replica using the original grating 1 will be described hereinafter.

(6) Step of Preparing Negative Grating

Figure 2H:
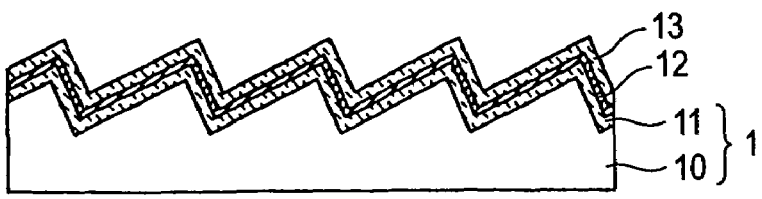
FIGS. 2H-2M are schematic sectional views of various steps (steps of producing negative and replica gratings) according to an embodiment of the method for the production of a blazed holographic grating of the invention.
Figure 2I:
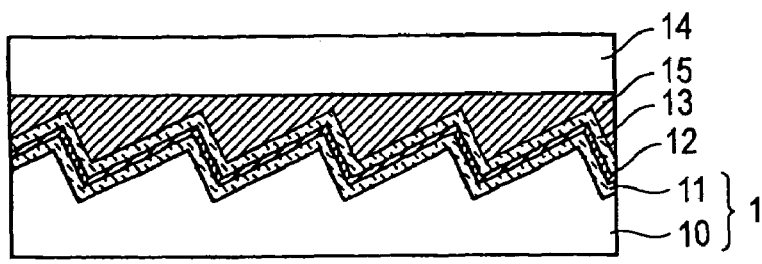
Figure 2J:
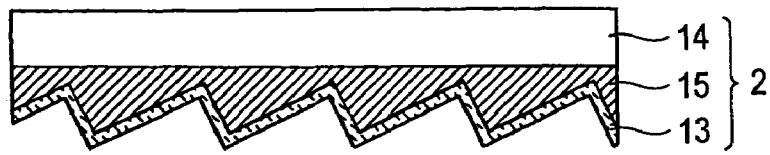
Figure 3:
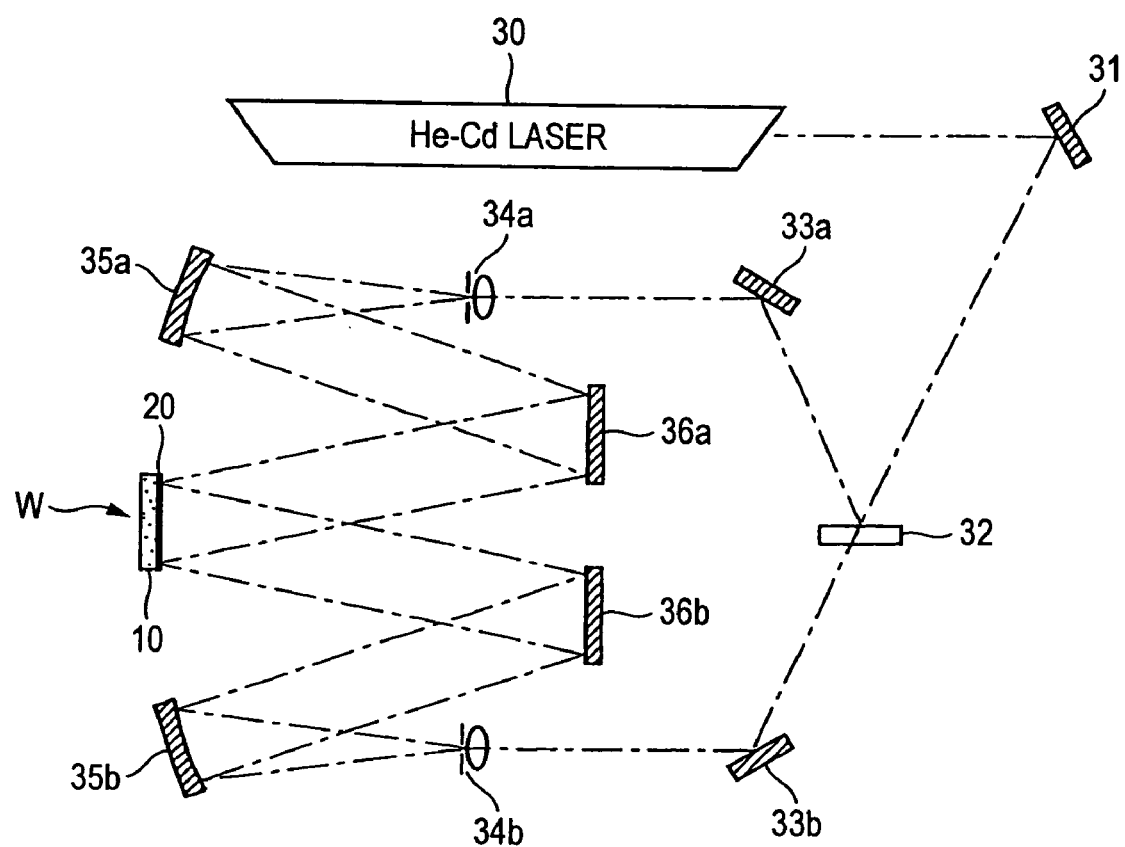
FIG. 3 is a schematic optical path diagram of the holographic exposure device to be used in the production method according to the present embodiment of implementation of the invention.

The aforementioned original grating 1 is subjected to vacuum metallizing to form a release agent layer 12 and an aluminum layer 13 on the surface of the grating groove sequentially (FIG. 2H). As the release agent layer there may be used, e.g., a thin layer of oil such as silicon grease (thickness: approx. 1 nm). The thickness of the aluminum layer 13 may be about 0.2 μm. Subsequently, the surface of the negative-working substrate 14 made of glass or the like is coated with an adhesive 15 such as epoxy resin. The original grating 1 and the negative-working substrate 14 are then laminated on each other with the adhesive 15 interposed therebetween (FIG. 2I). When the adhesive 15 is completely cured, the negative-working substrate 14 is then peeled off the original grating 1 at the adhesive layer 12 as border. The remaining release agent is then washed away with a solvent such as Freon. In this manner, the reversed shape of the grating groove of the original grating 1 is transferred to the adhesive 15. Thus, a negative grating 2 having a grating groove coated with an aluminum layer 13 is obtained (FIG. 2J).

The adhesive is not limited to epoxy resin. A thermosetting resin such as melanin resin and phenolic resin may be used. BENEF IX VL (produced by Adel Co., Ltd.), which is a visible light-curing resin, may be used.

(7) Step of Preparing Replica Grating

Figure 2K:
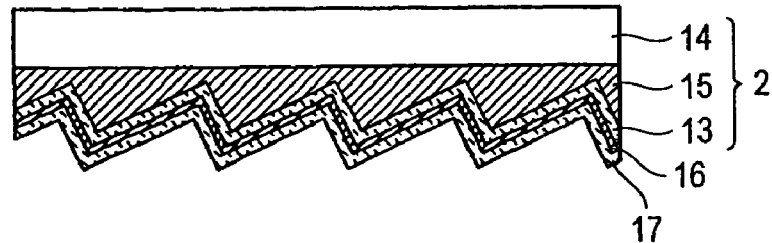
Figure 2L:
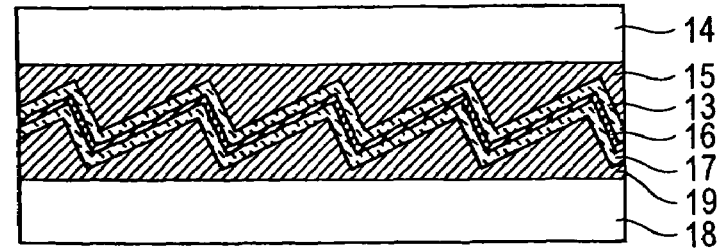
Figure 2M:
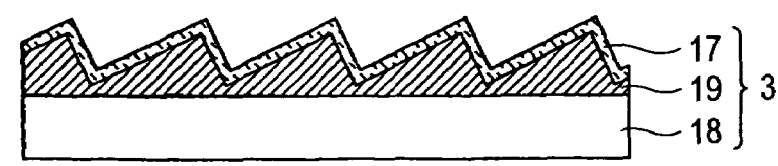

A replica grating 3 is then prepared using the negative grating 2 as a matrix. The procedure for the preparation of replica grating is the same as the negative grating 2. In some detail, a release agent layer 16 and an aluminum layer 17 are formed on the surface of the grating groove of the negative grating 2 (FIG. 2K). A replica substrate 18 is then stuck to the negative grating 2 with the adhesive 19 interposed therebetween (FIG. 2L). When the adhesive 19 is cured, the replica substrate 18 is then peeled off the negative grating 2 at the release agent layer 16 as border. In this manner, the diffraction grating groove of the negative grating 2 is reversely transferred to the adhesive 19. Thus, a replica grating 3 having a diffraction grating groove coated with an aluminum layer 17 as shown in FIG. 2M is obtained. Accordingly, the profile of the diffraction grating groove of the replica grating 3 is ideally the same as that of the original grating 1.

Figure 4:
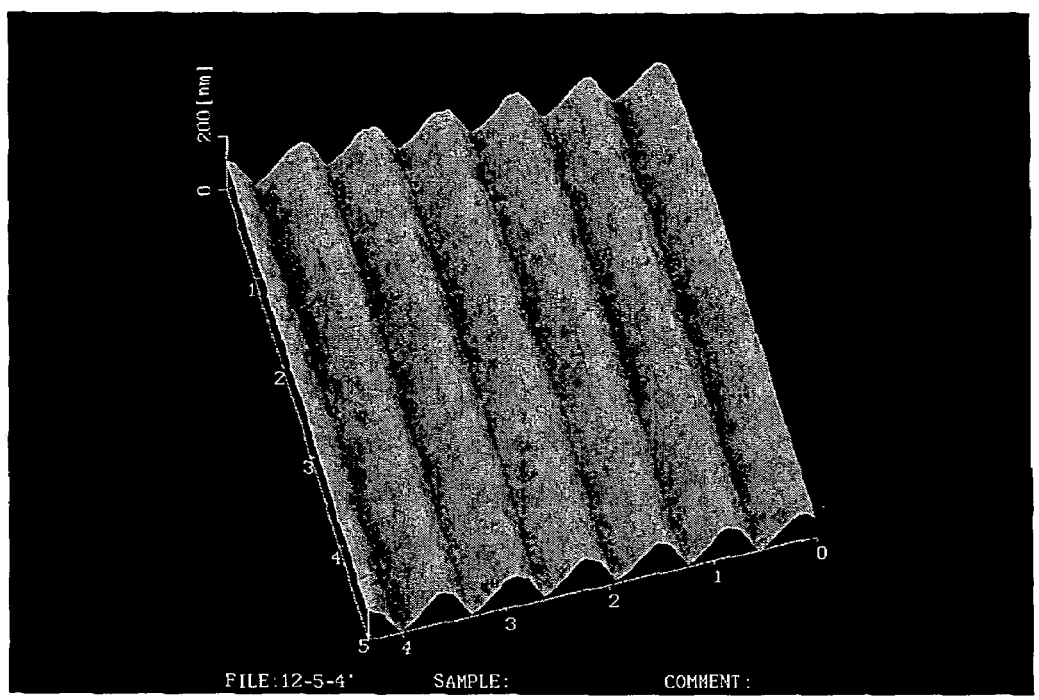
FIG. 4 is an AFM image of BHG observed when about ⅓ of the resist pattern remains in the production method according to the present embodiment.
Figure 5:
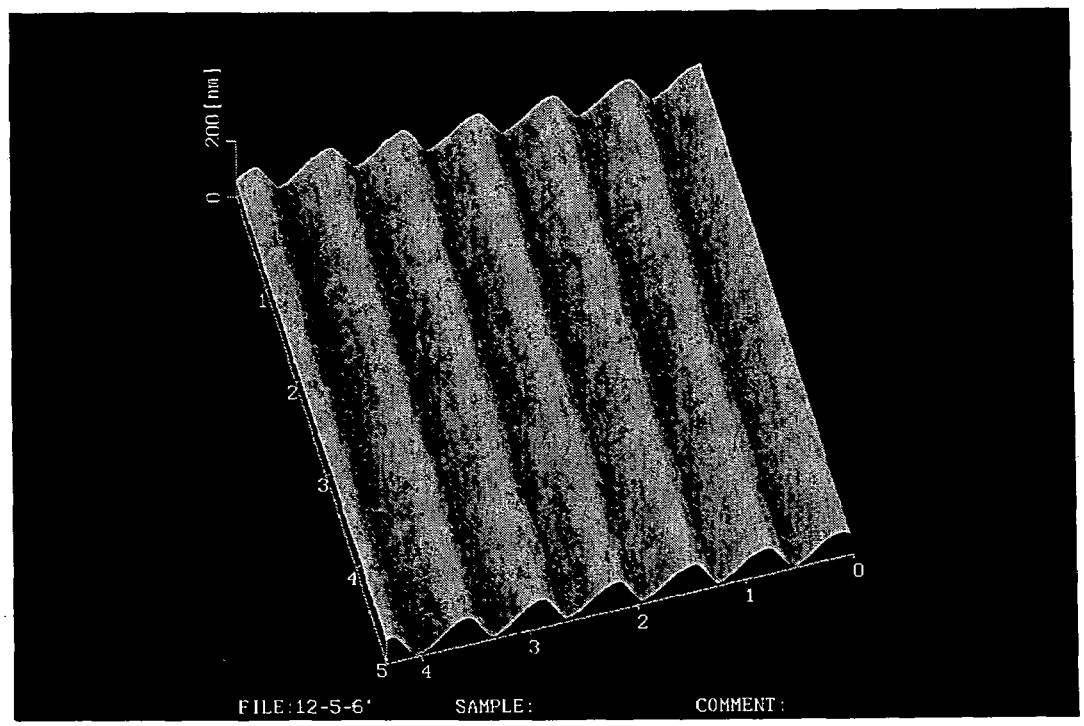
FIG. 5 is an AFM image of BHG prepared by the production method according to the present embodiment.
Figure 6:
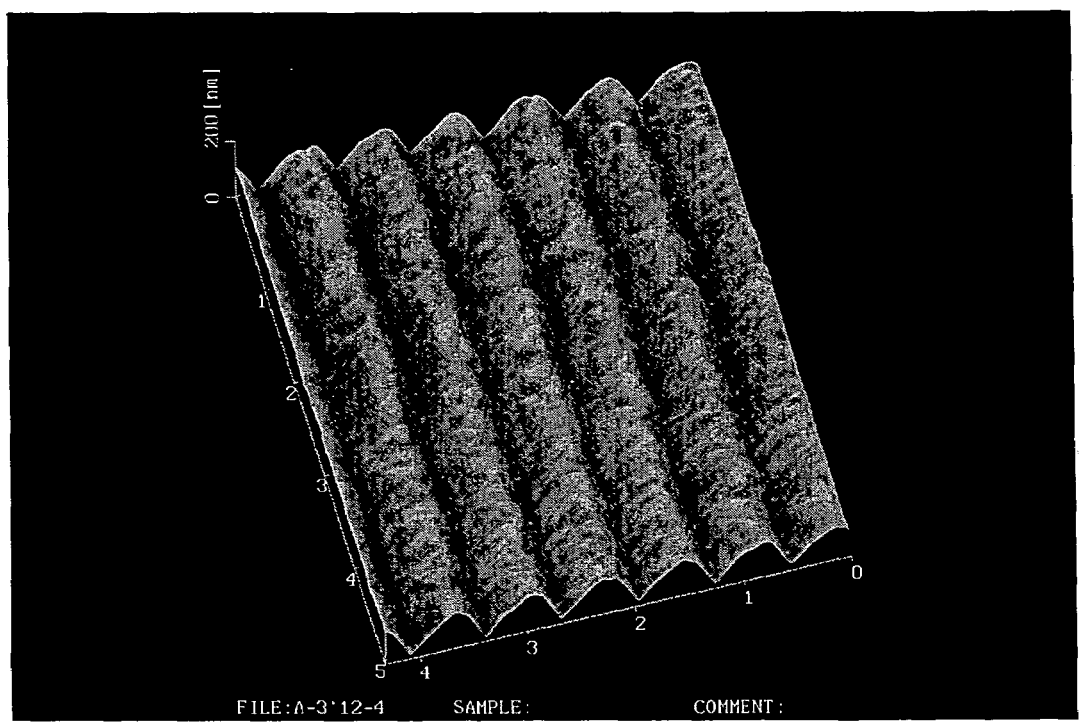
FIG. 6 is an AFM image of BHG prepared by the related art method.

The reason why the method for the production of BHG according to the present embodiment of implementation of the invention provides a diffraction grating groove the vertex of which is formed by two linear sides to have a good sharpness on the top thereof and a very small roughness in the vicinity of the top thereof will be described hereinafter. FIGS. 4 and 5 each illustrate an image obtained by observing the grating groove of BHG under AFM similarly to FIG. 6 wherein FIG. 4 is an AFM image of BHG obtained when the first ion beam etching step according to the present embodiment is completed and FIG. 5 is an AFM image of BHG (original grating) obtained according to the production method of the present embodiment.

At the first ion beam etching step, the substrate 10 is etched obliquely at the same angle as the blaze angle in the presence of an etching gas having a great selectivity ratio. During this procedure, the substrate 10 is cut faster than the resist pattern 21. However, the same surface roughness as that of the photoresist is merely reflected on the reflective surface of the grating groove of the substrate 10, causing no drastic surface roughening, so far as the etching is effected to an extend such that the resist pattern 21 does not disappear and still remains. In other words, FIG. 4 illustrates an AFM image of BHG in this state. As can be seen in the comparison with FIG. 6, which illustrates an AFM image of BHG according to the related art method, the reflective surface of the grating groove is smooth. In this state, BHG generates little scattered light as well as little stray light.

However, if the first ion beam etching step continues until the resist pattern 21 disappears completely, the effect of the unevenness in the height of the resist pattern 21 appears remarkably. In other words, if the etching is terminated when the photoresist at the position where the initial height of the resist pattern 21 is low disappears, the photoresist still remains at the position where the initial height of the resist pattern 21 is high, leaving the sawtooth grating groove of the substrate uncompleted. On the contrary, if the etching is terminated when the photoresist at the position where the height of the resist pattern 21 is high in the initial stage disappears, the etching has continued free of resist pattern at the position where the initial height of the resist pattern 21 is low and a sawtooth grating groove has already been completed on the substrate 10. Therefore, the vertex of the groove which has been sharpened with much effort is cut and rounded. Accordingly, at whatever time the etching is terminated, the vertex of the grating groove cannot be well sharpened. Further, the grating groove meanders crosswise, deteriorating periodicity.

Further, at the first ion beam etching step, an etching gas having a high selectivity ratio is used. Thus, if this etching continues until the resist pattern 21 disappears completely, the effect of increasing the surface roughness in the direction of height of the photoresist on the substrate 10 by the amount of the ration at which the substrate 10 is cut faster than the resist pattern 21 appears remarkably. As a result, the roughness of the reflective surface of the grating groove of the substrate 10 and the crosswise meandering of the grating groove are worsened. Moreover, as previously mentioned, carbon in $CF_4$ ion separates out on the surface of the photoresist, giving so-called carbon-rich state that not only prevents effective etching but also causes surface roughening, even collapse of the profile of the resist pattern if the etching continues while carbon is left unremoved from the surface of the photoresist.

In order to solve the aforementioned problems, the method for the production of BHG according to the present embodiment employs a procedure of terminating the first ion beam etching step when the height of the resist pattern 21 decreases to about ⅓ of the initial value and then executing a second ion beam etching step in a different direction of incidence of ion beam in the presence of a different etching gas until the resist pattern 21 disappears completely from the substrate 10. By thus changing the direction of incidence of ion beam, the state of incidence of ion beam on the two surfaces forming the vertex of the grating groove is almost identical, making it possible to well balance the cutting of the two surfaces. In this manner, the two surfaces have a raised linearity. Further, even when the etching continues after the disappearance of the resist pattern (overetching is effected), the cutting of the two surfaces forming the vertex can be well balanced, making it easy to keep the vertex sharpened and causing little crosswise meandering of the vertex.

Further, the use of a mixture of $CF_4$ and $O_2$ having a smaller selectivity ratio causes the etching to be effected faster on the resist pattern 21 but slower on the substrate 10 than the single use of $CF_4$. In some detail, a mixture of $CF_4$ and $O_2$ where the mixing proportion of $O_2$ is of 60% has a selectivity ratio of 0.33, which is a drastic drop (to about ⅓) from that of $CF_4$ alone (3). The surface roughness of the resist pattern 21 is not smaller than the size of one particle of photoresist, i.e., resolution. Further, under the effect of noise during exposure, the surface roughness of the resist pattern 21 is from about 10 to 20 nm on PV basis. However, in accordance with the production method according to the present embodiment, the surface roughness of the diffraction grating pattern engraved on the substrate 10 according to the aforementioned selectivity ratio is reduced from that of the resist pattern. As a result, the surface roughness of the diffraction grating pattern on the substrate 10 is only from 3 to 7 nm on PV basis, making it possible to drastically reduce the amount of scattered light component. Moreover, the mixing of $O_2$ with $CF_4$ makes it possible to react carbon separated out on the surface of the resist pattern with $O_2$ during ion beam etching and separate the carbon positively from the surface of the resist pattern. In this manner, the surface roughening of the grating groove due to the enrichment of the surface of the resist pattern 21 with carbon can be prevented as well.

BHG thus prepared by the production method according to the present embodiment is as shown in FIG. 5. In other words, as can be seen in the comparison with FIG. 6, the roughness of the reflective surface of the grating groove is reduced and the meandering of the groove is suppressed. Further, the vertex of the groove is sharpened, and the two sides forming the vertex are not curved or bent but are linear. In this arrangement, a high diffraction efficiency can be obtained. At the same time, scattered light is reduced and stray light can be suppressed. In some detail, as mentioned above, the use of BHG (original grating) prepared by the aforementioned production method makes it possible to obtain a peak of diffraction efficiency at a wavelength of about 230 nm and hence wavelength distribution characteristics suitable for ultraviolet visible spectrophotometer. The peak diffraction efficiency is about 80%. Thus, taking into account the fact that the diffraction efficiency obtained with BHG according to the related art method is about 65%, an efficiency enhancement as drastic as about 20% can be attained. Further, stray light, which is a very important factor for grating mounted on spectroscope, can be eliminated as well. It was also confirmed that the percent generation of stray light, which has heretofore been normally about 0.04%, can be reduced to about 0.01%.

Further, since the original grating has a grating groove with a reduced surface roughness and a desired profile in the vicinity of the vertex thereof, it goes without saying that the replica grating prepared from the original grating, too, exhibits a drastically enhanced efficiency and reduced percent generation of stray light as compared with the related art replica grating, though being inferior to the original grating.

In the method for the production of BHG according to the aforementioned embodiment, the height of the resist pattern (depth of groove) at the time when the first ion beam etching step is terminated and the kind of the etching gas and the mixing ratio of $CF_4$ and $O_2$ at the first and second ion beam etching steps are not limited to those described above. In other words, the first ion beam etching step requires the use of an etching gas having a great selectivity ratio, i.e., great rate of etching on the substrate 10 to cut the substrate 10 into sawtooth at a small blaze angle. Besides $CF_4$, other fluorine-based gases such as $CH_4$, $SF_6$ and $CBRF_3$ may be used. The height of the resist pattern at the time when the first ion beam etching step is terminated may be about ½ or ¼ of the initial height d. In this case, the selectivity ratio is preferably changed by properly adjusting the mixing ratio of $O_2$ to $CF_4$ in the etching gas to be used at the second ion beam etching step. In other words, since the height of the resist pattern at the time when the first ion beam etching step is terminated and the selectivity ratio of the etching gas are related to each other, they are preferably predetermined depending on the desired properties of BHG.

It will be apparent to those skilled in the art that various changes, modifications or additions can be made in the aforementioned embodiments with respect to other constitutions without departing from the spirit and scope of the invention.

What is claimed is:

1. A method for producing a blazed holographic grating, the method comprising executing in sequence the following steps:

a) a resist pattern preparing step of subjecting a photoresist layer provided on a substrate to holographic exposure to form a sinusoidal or half-sinusoidal resist pattern on the substrate;

b) a first ion beam etching step of irradiating the substrate having a sinusoidal or half-sinusoidal resist pattern formed thereon with an ion beam obliquely at an angle that is substantially identical to a desired blaze angle in the presence of a first etching gas having a high selectivity ratio to execute etching until a height of the resist pattern decreases to a predetermined ratio of an initial value; and c) a second ion beam etching step of irradiating the substrate with an ion beam in the direction corresponding to substantially half a vertical angle of a vertex of a grating groove pattern in the presence of a second etching gas having a smaller selectivity ratio than that of the first etching gas to execute etching until the remaining resist pattern disappears completely, whereby a sawtooth grating groove pattern is engraved directly on the substrate.

2. The method for producing a blazed holographic grating as defined in claim 1, wherein the first ion beam etching is terminated when the height of the resist pattern decreases to about ⅓ of the initial value, and the process then proceeds to the second ion beam etching step.

3. The method for producing a blazed holographic grating as defined in claim 1, wherein as the first etching gas to be used at the first ion beam etching step there is used a fluorine-based gas and as the second etching gas to be used at the second ion beam etching step there is used a mixture of the fluorine-based gas with oxygen.

4. A method for producing a replica grating for a blazed holographic grating, the method comprising executing in sequence the following steps:

a) a resist pattern preparing step of subjecting a photoresist layer provided on a substrate to holographic exposure to form a sinusoidal or half-sinusoidal resist pattern on the substrate;

b) a first ion beam etching step of irradiating the substrate having the sinusoidal or half-sinusoidal resist pattern formed thereon with an ion beam obliquely at an angle that is substantially identical to a desired blaze angle in the presence of a first etching gas having a high selectivity ratio to execute etching until a height of the resist pattern decreases to a predetermined ratio of an initial value; and c) a second ion beam etching step of irradiating the substrate with an ion beam in a direction corresponding to substantially half a vertical angle of a vertex of a grating groove pattern in the presence of a second etching gas having a smaller selectivity ratio than that of the first etching gas to execute etching until the remaining resist pattern disappears completely, whereby a sawtooth grating groove pattern is engraved directly on the substrate, and d) a transferring step of transferring the sawtooth grating groove pattern engraved directly in the substrate to the replica.

5. The method for producing a replica grating for a blazed holographic grating as defined in claim 4, wherein the transferring step further comprises:

a release agent adding step of disposing a release agent on the sawtooth grating groove pattern;

a metalizing step of disposing an aluminum layer on the release agent;

a laminating step of laminating a negative substrate to the aluminum layer with an adhesive disposed therebetween; and a separating step of peeling the negative substrate, the adhesive, and the aluminum layer from the release agent and the sawtooth grating groove pattern.

* * * * *